United States Patent Office 3,529,953
Patented Sept. 22, 1970

3,529,953
CYCLOOCTYL - 2 - ENE - 1 - OL ESTERS OF SUB-
STITUTED CARBANILIC ACIDS AS SELECTIVE
HERBICIDES
Raymond W. Luckenbaugh, 15 Imperial Drive,
Wilmington, Del. 19805
No Drawing. Continuation-in-part of application Ser. No.
425,632, Jan. 14, 1965. This application Feb. 1, 1968,
Ser. No. 702,176
Int. Cl. A01n 9/20
U.S. Cl. 71—111     10 Claims

ABSTRACT OF THE DISCLOSURE

Controlling the growth of annual weed grasses with compounds of the formula:

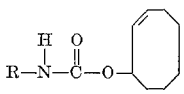

wherein R is phenyl, o-fluorophenyl or tolyl.

CROSS REFERENCE

This application is a continuation-in-part of my application Ser. No. 425,632, filed Jan. 14, 1965 now abandoned.

BACKGROUND OF THE INVENTION

Heretofore it has been necessary in most areas of the world to grow rice in flooded fields or paddies to control barnyardgrass. In these flooded fields conventional farm machinery cannot be used for obvious reasons. It has been my desire to discover compounds that will eliminate the need for flooding rice fields and allow the use of conventional farm machinery, thereby avoiding tedious hand labor and raising production.

SUMMARY OF THE INVENTION

This invention relates to methods of destroying weeds. More specifically, it refers to methods of selectively retarding the growth of annual weed grasses by applying to them a growth retardant amount of cyclooct-2-ene-1-ol ester with a carbanilic acid.

THE INVENTION

I have discovered that by applying a compound of Formula 1 below to an area in which there is growing crabgrass, foxtail, barnyardgrass, or Johnsongrass from seed there results a marked growth retardation of the seedling grass plants.

(1)

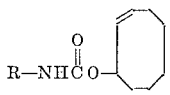

wherein R is phenyl, o-fluorophenyl, o-tolyl, m-tolyl or p-tolyl.

The compounds used in this invention retard the growth of crabgrass and like annual weed grasses without adverse effect on desirable grass crops such as rice, broadleaf plants such as dichondra, or established perennial turf grasses such as *Poa pratensis*, Kentucky bluegrass; Poa spp., other bluegrasses; Agrostis spp., bentgrass; and Festuca spp., fescues. Therefore, undesirable annual grasses, such as crabgrass, growing in a lawn or crop area treated with the compounds used in this invention are soon crowded out and destroyed.

A particularly advantageous use of the compounds of Formula 1 is in applications to fields used for growing rice. Barnyardgrass, a traditionally noxious weed in areas used for rice production, is controlled at low rates without adverse effect on rice plants. The paramount importance of a discovery of this nature is realized when one considers that more than half the world's population depends on rice as a staple food commodity.

Cylcooct-2-ene-1-ol ester with carbanilic acid can be prepared according to the procedure set forth in the Journal of the American Chemical Society, 76, 2757 (1954). The other compounds used in this invention can be synthesized in an analogous manner by substituting the appropriate isocyanate.

For the purposes of this specification and its claims Digiteria spp., crabgrass; Setaria spp., foxtail; Echinochloa spp., barnyardgrass; and related genera as well as *Sorghum halepense*, Johnsongrass, growing from seed are considered to be annual grass weeds.

COMPOSITIONS

Compositions of this invention comprise compounds of Formula I and one or more surface-active agents.

The surface-active agents also known as surfactants which are used in this invention can be wetting, dispersing, or emulsifying agents. They can act as wetting agents for wettable powders and dusts, as dispersing agents for wettable powders and suspensions, and as emulsifying agents for emulsifiable concentrates. Surfactants can also enhance the biological activity of the carbanilic acid esters used in this invention. Such surfactants, can include anionic cationic and non-ionic agents as have heretofore been generally employed in plant control compositions of similar type. Suitable surface-active agents are set out, for example, in Searle U.S. Pat. No. 2,426,417; Todd U.S. Pat. No. 2,655,447; Jones U.S. Pat. No. 2,412,510; or Lenher U.S. Pat. No. 2,139,276. A detailed list of such agents is set forth in "Detergents and Emulsifiers Annual—1967" by John W. McCutcheon, Inc.

Suitable surface-active agents for use in compositions of this invention include polyethylene glycol esters with fatty acids and rosin acids, polyethylene glycol ethers with alkylated phenols or with long-chain aliphatic alcohols, polyethylene glycol ethers with sorbitan fatty acid esters and polyoxyethylene thioethers. Other suitable surfactants include amine, alkali and alkaline earth salts of alkylaryl sulfonic acids; amine, alkali and alkaline earth salts of fatty alcohol sulfates; dialkyl esters of alkali metal sulfosuccinates; fatty acid esters of amine, alkali and alkaline earth isethionates and taurates; amine, alkali and alkaline earth salts of lignin sulfonic acids; methylated or hydroxyethylated cellulose; polyvinyl alcohols; amine, alkali and alkaline earth salts of polymerized alkyl naphthalene sulfonic acids; and long-chain quaternary ammonium compounds. Anionic and non-ionic surface-active agents are preferred.

Among preferred wetting agents are sodium alkylnaphthalene sulfonates; sodium dioctylsulfosuccinates; sodium dodecylbenzene sulfonate; ethylene oxide condensates with alkylated phenols such as octyl, nonyl or dodecylphenol; sodium lauryl sulfate; and trimethylnonyl polyethylene glycol. Among preferred dispersing agents are sodium, calcium and magnesium lignin sulfonates; low viscosity methyl cellulose; polymerized sodium alkylnaphthalene sulfonate; sodium N-oleoyl or N-lauryl isethionates; sodium N-methyl-N-oleoyl taurate; sodium dodecyldiphenyloxide disulfonate; and polyethylene oxide adducts to mixed fatty and rosin acids.

Among preferred emulsifying agents are ethylene oxide adducts to lauric, oleic, stearic or palmitic acid esters of sorbitol; polyethylene glycol esters with lauric, oleic, stearic, palmitic or rosin acids; oil soluble alkylaryl sulfonates; oil soluble polyoxyethylene ethers with octyl-, nonyl-, and dodecylphenol; polyoxyethylene adducts to long-chain mercaptans; and mixtures of these surfactants.

In general, less than 10% by weight of the surface-active agent will be used in compositions of this invention and ordinarily the amount of surface-active agents will range from 1–5% but can even be less than 1% by weight.

Additional surface-active agents can be added to the above formulation to increase the ratio of surface-active agent:active agent up to as high as 5:1 by weight. Normally the purpose of adding higher amounts of surfactant is to increase the growth retardant effect of the active compounds. When used at higher rates it is preferred that the surfactant be present in the range of one-fifth to five parts by weight surfactant for each one part by weight of active agent.

Plant growth retardant compositions of this invention can contain, with or without a surfactant, finely-divided inert diluents such as talcs, natural clays including attapulgite clay and kaolinite clay, pyrophyllite, diatomaceous earths, synthetic fine silicas, calcium silicate, carbonates, calcium phosphates, sulfur, lime and such flours as walnut shell, wheat, redwood, soybeans and cottonseed. The amount of the finely-divided inert solid diluent can vary widely but will generally range from 10 to 98% by weight of the growth retardant compositions. The particle size can vary considerably but will ordinarily be somewhat under 50 microns in the finished formulation.

Compositions containing such finely-divided diluents and one or more of the above-mentioned surfactants can be in the form of wettable powders. Such wettable powders are prepared by mixing a compound of Formula 1, surfactants, diluents and other optional ingredients such as corrosion inhibitors, antifoam agents, pigments, etc., in a blender, followed by grinding to obtain a product of fine particle size, suitable for dilution in water and subsequent application as a finely atomized aqueous spray. Such wettable powders can contain 20 to 90% by weight active ingredient, ½ to 10% by weight of surface-active agent, plus diluents and optional formulative additives. An active ingredient content of 35 to 85% by weight is preferred.

When the composition contains a pulverulent solid and no surfactant, as in dusts or granules, the amount of active ingredient is limited to 0.5% to 10% by weight of the composition.

Composition containing the active compound and inert solid diluent can also be formulated into granules. In such compositions the diluent will generally range from 65 to 99% by weight and the active ingredient can range from 1 to 35% by weight. It should be understood that it will not be necessary to include a surfactant in the granular composition. To prepare granules the active compound can be dissolved in a solvent and this solution can be sprayed over pre-formed clay granules, expanded vermiculite or the like to distribute the active ingredient over and throughout the granular mass. Such granules can range in particle size of from +60 mesh to +4 mesh. An active ingredient content of 1 to 6% is preferred. It is also possible to make such granules by mixing the finely-divided diluent and finely-divided active ingredient, for instance by grinding together, and then forming granules by adding water, tumbling and drying the resulting product, or by extruding the wet mass into strands which are dried and granulated. In another embodiment the active ingredient can be included in granular fertilizer compositions. In addition to the diluents, granular compositions can contain additives such as binders, surfactants and the like.

Emulsifiable oil solutions can also be employed with the carbanilic acid esters used in this invention. In these plant growth regulant compositions, the surface-active agent and an oil form a liquid which can be conveniently poured and measured. Such solutions can be mixed with water at the point of application to form an emulsion containing the herbicides and the surface-active agent. Such compositions have the advantage that the oil will often act as a foam inhibitor and thus reduce the tendency for large amounts of surfactants to form objectionable foam. The oil used, such as toluene, kerosene, Stoddard solvent, xylene, alkylated naphthalenes, diesel oil, isophorone and the like should be preferably water immiscible and be of a type in which the active agent will be soluble in the amounts used in particular formulations.

In the emulsifiable oil concentrations, a compound of Formula 1 will be present in amounts ranging from 10 to 35% by weight. Precise concentrations of active agent, of course, will depend on the intended use of the composition. When mixed with water at the point of application, the oil concentration will be diluted so that in the final formulation the active agent will be present in amounts ranging from about 0.5% to 2% by weight.

It is, of course, also possible to use such oil solutions of a carbanilic acid ester by extending the solution with other oils, for example, diesel oil, herbicidal oil and the like.

APPLICATION

A compound of Formula 1 can be applied directly to the soil in pre-emergence or post-emergence treatment to foliage or the compound can be mixed intimately with the soil. Rates of application can be in the range of ½ to 20 pounds per acre and preferably will be used at the rate of 1 to 15 pounds per acre.

More specifically, as a pre-emergence application on crop lands 2 to 8 pounds per acre of the compound used in this invention will retard the growth of annual grass weeds. There is a good safety margin to crop plants.

As a directed post-emergence application on crop lands at any time from the moment the weeds emerge to the 3-leaf stage, the plants being approximately 2.5 to 4 inches high, 4 to 10 pounds per acre of active ingredient will prevent the further development of such grasses as crabgrass, Johnsongrass from seed, foxtail, and barnyardgrass. There is a good safety margin to crop plants.

As an application on established growing lawns before crabgrass appears, growth of the undesirable crabgrass is retarded with 2 to 10 pounds of active ingredient per acre. There is no injury to established Kentucky bluegrass, bentgrasses or fescues.

As an application on lawn areas either before or after seeding lawn grasses such as bluegrass, bentgrass or fescue and before the lawn grasses and crabgrass have emerged, 2 to 8 pounds of active ingredient per acre prevents the development of crabgrass. There is no undesirable effect on the development of the lawn grasses.

As an application on newly-seeded lawns after such lawn grasses as bluegrass, bentgrass, fescues and crabgrass have appeared 2 to 8 pounds of active ingredient will prevent the further development of crabgrass. There is no perceptible injury to the desirable lawn grasses.

As an application on established lawns after the crabgrass appears at emergence to the 3-leaf stage, 3 to 16 pounds per acre of the active ingredient will prevent the further development of crabgrass without injury to the established grasses.

A compound of Formula 1 can also be applied admixed or in common solution with other chemicals which are used in agronomic and horticultural management and are compatible with the compounds of this invention. Such chemicals may be, but are not restricted to, the classes of chemicals commonly known as plant nutrients, fertilizers, insecticides, fungicides, herbicides and nematocides.

Typical of the insecticides that can be used are:

1,2,3,4,10,10-hexachloro-6,7-epoxy-1,4,4a,5,6,7,8,8a-octahydro-1,4,5,8-dimethanonaphthalene (Dieldrin),
1,2,4,5,6,7,8,8-octachloro-4,7-methano-3a,4,7,7a-tetrahydroindane (Chlordane),
1,1,1-trichloro-2,2-bis(p-methoxyphenyl)ethane (Methoxychlor),
1,1,1-trichloro-2,2-bis(p-chlorophenyl)ethane (DDT) and
1-napthyl-N-methylcarbamate ("Sevin").

Based on the weight of the carbanilic acid ester, 0.02 to 10 parts by weight of insecticides will be present.

Fungicides that can be used in conjunction with the compounds used in this invention include one or more of the following:

p-Dimethylaminobenzenediazo sodium sulfonate;
quinone oxyaminobenzooxohydrazone;
tetraalkyl thiuramsulfides such as tetramethyl thiuram monosulfide or disulfide and tetraethyl thiuran monosulfide or disulfide;
metal salts of ethylene bisdithiocarbamic acid, e.g. manganese, zinc, iron and sodium salts;
pentachloronitrobenzene;
dodecylguanidine acetate;
N-trichloromethylthio tetrahydrophthalimide (captan);
phenylmercury acetate;
2,4-dichloro-6-(o-chloroanilino)-s-triazine N-methyl-mercury p-toluenesulfoanilide;
chlorophenol mercury hydroxides;
nitrophenol mercury hydroxides;
ethyl mercury acetate;
ethyl mercury 2,3-dihydroxypropyl mercaptide;
methyl mercury acetate;
methyl mercury 2,3-dihydroxypropyl mercaptide;
3,3'-ethylenebis(tetrahydro-4,6-dimethyl-2H-1,3,5-thiadiazine-2-thione);
methyl mercury dicyandiamide;
N-ethyl mercury p-toluene sulfoanilide;
metal (e.g. iron, sodium and zinc), ammonium and amine salts of dialkyldithiocarbamic acids;
tetrachloronitroanisole;
hexachlorobenzene;
methyl mercury nitrile;
tetrachloroquinone; and
N-trichloromethylthiophthalimide.

Generally, one can use 0.02 to 10 parts of fungicide by weight based on the carbanilic acid ester.

The control of grass weeds with a compound of Formula 1 often can be advantageously accomplished together with the use of conventional herbicides in situations where the grass weed is growing with weeds controlled by the second herbicide.

Illustrative of herbicides that can be used in conjunction with the compounds of this invention in sprays and granular formulations to take weeds out of other desirable plants are the following:

| Lbs/acre | Herbicide | Desirable plants |
| --- | --- | --- |
| 1-3 | 2,4-dichlorophenoxyacetic acid | Sugar cane and roadside turf grasses. |
| 0.3-1 | 2,4,5-trichlorophenoxyacetic acid | Roadside turf grasses. |
| 0.5-1.5 | 2,4,5-trichlorophenoxypropionic acid | Do. |
| 2-4 | 3-amino-2,5-dichlorobenzoic acid | Soybeans. |
| 1-4 | 2,4-bis(isopropylamino)-6-methylmercapto-s-triazine | Soybeans, cotton and sugar cane. |
| 1-4 | 1-n-butyl-3-(3,4-dichlorophenyl)-1-methylurea | Ornamentals and lawn turf grasses. |
| 1-3 | 2-chloro-4,6-bis-(ethylamino)-s-triazine | Ornamentals. |
| 1-4 | 2-chloro-4-ethylamino-6-isopropylamino-s-triazine | Sugar cane and pineapples. |
| 1-4 | 3-(p-chlorophenyl)-1,1-dimethylurea | Pineapple and sugar cane. |
| 0.5-2 | 4-(2,4-dichlorophenoxy)-butyric acid | Alfalfa and other legumes. |
| 0.5-2 | 2-methyl-4-chlorophenoxybutyric acid | Do. |
| 1-4 | 3-(3,4-dichlorophenyl)-1,1-dimethylurea | Sugar cane, pineapple, grass seed crops and alfalfa. |
| 1-4 | N-(3,4-dichlorophenyl)-methacrylamide | Cotton. |
| 1-3 | 3-(3,4-dichlorophenyl)-1-methoxy-1-methylurea | Soybeans. |
| 1-4 | 1,2-dihydropyridazine-3,6-dione | Roadside turf grasses. |
| 1-4 | 2-ethylamino-4-isopropylamino-6-methylmercapto-s-triazine | Sugar cane. |
| 1-3 | Sodium 2,4-dichlorophenoxyethylsulfate | Soybeans. |

Where the added herbicides are acids, they may be in the form of salts or non-volatile ester formulations. Also contact herbicides may be included, such as cacodylic acid, potassium cyanate, dinitro-sec-butyl phenol, 1,1'-ethylene-2,2'-bipyridylium dibromide (diquat), 1,1'-dimethyl-4,4'-bipyridylium dichloride (paraquat), disodium methylarsonate, amine methylarsonates and others well known to the art.

Granular compositions of the invention can also include mixtures of the active ingredient on or in fertilizer granules such as are conventionally used for dry application to lawns, golf courses, fairways, greens and the like.

In such compositions the active ingredient content can range from 0.5 to 10% by weight and can be applied to the surface of previously granulated fertilizer or distributed throughout the fertilizer mass prior to granulation. As an example, a conventional 20:10:10 turf food on vermiculite can be treated with a spray containing a solution of the retardant at a rate to give 4% to 8% by weight of active ingredient in the finished product. This yields a composition applicable in standard lawn spreaders at a rate, for example, of 25 pounds per 5,000 square feet to provide a simultaneous fertilization and long term crabgrass control.

It is understood that a compound of Formula 1 and compositions containing the active compound are applied to the "locus" of the grass growth. By "locus" is meant the plant itself when visible above the ground or the immediate area of soil where the grass plant itself is developing.

The following additional examples, in which all percents and parts unless otherwise specified are by weight, are provided to more clearly explain this invention.

EXAMPLE 1

A mixture of 28 parts of 2-cycloocten-1-ol and 27 parts of phenyl isocyanate is allowed to stand overnight at ambient temperature in a closed vessel. The resulting solid is recrystallized from ligroin as colorless needles of cyclooct-2-ene-1-ol ester with carbanilic acid, melting at 92.5–93° C.

This active compound is formulated as follows:

|   | Percent |
| --- | --- |
| Cyclooct-2-ene-1-ol ester with carbanilic acid | 50 |
| Diatomaceous silica | 48 |
| Coconut acid ester of sodium isethionate | 1 |
| Sodium lauryl sulfate | 1 |

The ingredients are blended and micropulverized to pass a 60-mesh screen.

This wettable powder formulation in the amount of four pounds of active ingredient is added to 80 gallons of water in a spray tank. A surfactant such as trimethyl nonyl ether of polyethylene glycol with ethylene oxide, is added to this mixture at the rate of six pounds. This tank spray mixture is applied by aerial spray to one acre of two to three inch tall rice infested with barnyardgrass about one to two inches tall. Excellent retardation of barnyardgrass is obtained.

EXAMPLES 2–5

The following active compounds are synthesized in the manner of the cyclooct-2-ene-1-ol ester with carbanilic acid of Example 1 by substituting a like amount by weight of the below indicated isocyanate for the phenyl isocyanate of Example 1. The active compounds are separately formulated and applied in the manner of the cyclooct-2-ene-1-ol ester with carbanilic acid of Example 1 in like amount by weight. Like results are achieved.

| Ex. No. | Isocyanate | Active compound |
| --- | --- | --- |
| 2 | o-Fluorophenyl isocyanate | Cyclooct-2-ene-1-ol ester with o-fluorocarbanilic acid. |
| 3 | o-Tolyl isocyanate | Cyclooct-2-ene-1-ol ester with o-methylcarbanilic acid. |
| 4 | m-Tolyl isocyanate | Cyclooct-2-ene-1-ol ester with m-methylcarbanilic acid. |
| 5 | p-Tolyl isocyanate | Cyclooct-2-ene-1-ol ester with p-methylcarbanilic acid. |

EXAMPLE 6

| | Percent |
|---|---|
| Cyclooct-2-ene-1-ester with carbanilic acid | 52.6 |
| Pikes Peak clay | 44.4 |
| Sodium dioctyl sulfosuccinate | 1.5 |
| Sodium lignin sulfonate | 1.5 |

The above components are blended and micropulverized until homogeneous and then reblended.

A sufficient quantity of the above composition is extended with water so that three pounds of active ingredient is applied in 40 gallons of water to an acre of newly set flue cured tobacco. This field contains crabgrass and Johnsongrass seedlings. A tractor-mounted sprayer designed to spray a blanket application to the soil surface is used for the treatment in the early morning hours before the plants are wilted. The treatment provides control of crabgrass and Johnsongrass seedlings without injury to the tobacco.

EXAMPLE 7

| | Percent |
|---|---|
| Cyclooct-2-ene-1-ol ester with carbanilic acid | 20 |
| A blend of polyoxyethylene ethers and oil soluble sulfonates | 5 |
| Alkylated naphthalene (principally α-methyl naphthalene) | 75 |

The above components are blended and agitated until a homogeneous mixture is obtained.

This emulsifiable formulation containing four pounds of active compound is extended with water to a total volume of ten gallons. It is applied on an acre of rice infested with barnyardgrass. The rice is two to three inches tall and the barnyardgrass is one to two inches tall. Aerial spray is used for the application. Excellent growth regulation of barnyardgrass is obtained and an excellent yield of rice results.

The other active compounds used in this invention can be formulated and applied in like manner to the cyclooct-2-ene-1-ol ester with carbanilic acid of this example. Like results are achieved.

EXAMPLE 8

| | Percent |
|---|---|
| Cyclooct-2-ene-1-ol ester with carbanilic acid | 25.00 |
| Alkyl naphthalene sulfonic acid, Na salt | 1.00 |
| Low viscosity methyl cellulose | 0.25 |
| Attapulgite clay | 73.75 |

The above components are blended and micropulverized until homogeneous and then reblended.

The formulation described above is applied to an acre of field beans of the red kidney variety prior to emergence of the annual grass weeds known to be barnyardgrass, crabgrass, and foxtail. Approximately five pounds per acre of active ingredient is used. Excellent control of the weeds is obtained without noticeable damage to the beans.

The other active compounds used in this invention can be formulated and applied in like manner to the cyclooct-2-ene-1-ol ester with carbanilic acid of this example. Like results are obtained.

EXAMPLE 9

The following granular formulation can be used. A wettable powder is first prepared by micropulverizing the following ingredients:

| | Percent |
|---|---|
| Cyclooct-2-ene-1-ol ester with carbanilic acid | 50 |
| Attapulgite clay | 48 |
| Dioctyl sodium sulfosuccinate | 1 |
| Sodium lignin sulfonate | 1 |

The wettable powder is distributed over the surface of a No. 4 vermiculite by tumbling together. To make the combination more adherent the mix is sprayed with a mixture of ethylene glycol and water. The final ratio of ingredients is as follows:

| | Percent |
|---|---|
| 50% active wettable powder | 4 |
| No. 4 vermiculite | 86 |
| Ethylene glycol | 5 |
| Water | 5 |

In a modification of the above formulation the ethylene glycol can be replaced by a mixture of the sodium sulfates of mixed long chain alcohol fatty acid esters and diethylene glycol acetate in a ratio between 1:10 and 10:1 by weight.

The granular formulation described above has utility as a pre-emergence treatment for retarding the growth of crabgrass in established perennial ryegrass turf. The material is applied with a granule spreader at the rate of six pounds of active ingredient per acre prior to the germination of crabgrass. Such excellent retardation of crabgrass is obtained that it presents no competition to the established ryegrass turf.

Immediately after a field has been prepared for transplanting flue-cured tobacco seedlings, a fertilizer spreader is used to spread evenly 100 pounds per acre of the 4% active granular formulation over the entire area. After application, the tobacco is transplanted from the seed bed to the field. The application of granules in this manner results in outstanding control of crabgrass throughout the season with no injury to the tobacco crop.

The other active compounds used in this invention can be formulated and applied in like manner to the cyclooct-2-ene-1-ol ester with carbanilic acid of this example. Like results are achieved.

EXAMPLE 10

| | Percent |
|---|---|
| Cyclooct-2-ene-1-ol ester with o-fluorocarbanilic acid | 20 |
| A blend of polyoxyethylene ethers and oil soluble sulfonates | 5 |
| Alkylated naphthalene (principally α-methyl naphthalene) | 75 |

The above components are blended and agitated until a homogeneous mixture is obtained.

Sufficient formulation to contain six pounds of active ingredient are emulsified in 40 gallons of water and sprayed on an acre of bluegrass lawn infested with crabgrass. The visible crabgrass is in the two-leaf stage but some of the crabgrass seeds present have not germinated. The treatment so severely retards the existing crabgrass that it does not cause damage to the lawn. Also the treatment prevents the development of new crabgrass from seed for a period of several weeks.

The other active compounds used in this invention can be formulated and applied in like manner to the cyclooct-2-ene-1-ol ester with o-fluorocarbanilic acid of this example. Like results are achieved.

The invention claimed is:

1. Method for selectively controlling the growth of annual weed grasses in the presence of desirable forms of vegetation comprising applying to the locus of said weed grasses and desirable vegetation an effective amount of a growth retardant compound of the formula

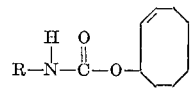

wherein

R is selected from the group consisting of
   phenyl,
   o-fluorophenyl,
   o-tolyl,
   m-tolyl, and
   p-tolyl.

2. Method according to claim 1 wherein the locus is in a lawn.

3. Method according to claim 1 wherein the locus is in a cultivated field.

4. Method according to claim 1 where the compound applied is cyclooct-2-ene-1-ol ester with carbanilic acid.

5. Method according to claim 1 where the compound applied is cyclooct-2-ene-1-ol ester with o-fluorocarbanilic acid.

6. Method according to claim 1 where the compound applied is cyclooct-2-ene-1-ol ester with o-methyl carbanilic acid.

7. Method according to claim 1 where the compound applied is cyclooct-2-ene-1-ol ester with m-methyl carbanilic acid.

8. Method according to claim 1 where the compound applied is cyclooct-2-ene-1-ol ester with p-methyl carbanilic acid.

9. Method for selectively controlling the growth of annual grass weeds growing in the presence of a perennial turf grass comprising applying to the locus of said annual and perennial grass in an amount sufficient to retard the growth of said annual grasses a compound of the formula:

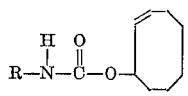

wherein

R is selected from the group consisting of
phenyl,
o-fluorophenyl,
o-tolyl,
m-tolyl, and
p-tolyl.

10. Method for selectively controlling barnyardgrass growing in the presence of rice comprising applying to the locus of said barnyardgrass and rice in an amount sufficient to retard the growth of said barnyardgrass a compound of the formula:

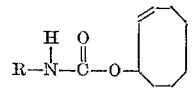

wherein

R is selected from the group consisting of
phenyl,
o-fluorophenyl,
o-tolyl,
m-tolyl, and
p-tolyl.

References Cited

UNITED STATES PATENTS

| | | | |
|---|---|---|---|
| 2,776,196 | 1/1957 | Gysin et al. | 71—111 |
| 2,776,197 | 1/1957 | Gysin et al. | 71—111 |
| 3,238,036 | 3/1966 | Herrett | 71—111 |
| 3,253,904 | 5/1966 | Harrison | 71—78 |

OTHER REFERENCES

George et al.: Journal of Agricultural and Food Chemistry, 2, 356–363 (1954).

JAMES O. THOMAS, JR., Primary Examiner

U.S. Cl. X.R.

71—83, 92, 93, 94, 97

PO-1050
(5/69)

UNITED STATES PATENT OFFICE
CERTIFICATE OF CORRECTION

Patent No. 3,529,953          Dated September 22, 1970

Inventor(s) Raymond W. Luckenbaugh

It is certified that error appears in the above-identified patent and that said Letters Patent are hereby corrected as shown below:

Following the title of the patent, and the inventor's name and address appearing at lines 1 to 5 of Column 1, insert the following phrase -- assignor to E. I. du Pont de Nemours and Company, Wilmington, Delaware, a corporation of Delaware. --

SIGNED AND
SEALED
JAN 12 1971

(SEAL)
Attest:

Edward M. Fletcher, Jr.
Attesting Officer

WILLIAM E. SCHUYLER, JR.
Commissioner of Patents